Patented Dec. 1, 1953

2,661,335

UNITED STATES PATENT OFFICE 2,661,335

LUBRICATING COMPOSITION

John Mann Butler, Centerville, Ohio, assignor to Monsanto Chemical Company, St. Louis, Mo., a corporation of Delaware No Drawing. Application September 28, 1951, Serial No. 248,870

1 Claim. (Cl. 252—35)

This invention relates to a method of preparing solid lubricants which have improved tackiness and adhesion to bearing surfaces and which do not spatter when subjected to sudden loads or impact. Particularly the invention relates to chemical compositions which thicken or solidify fluid hydrocarbon lubricants and induce tackiness and adhesive properties to liquid, solid or semi-solid hydrocarbons.

It is well-known that alkylated polystyrene prepared from low molecular weight polystyrene, for example 10,000 or upward to 100,000, can be used to improve the temperature-viscosity characteristics of liquid oils. It is also known that polystyrenes having molecular weights in excess of 80,000 are not particularly desirable because of the lack of "shear stability," the capacity for retaining their high viscosity when subjected to severe shearing stress.

The primary purpose of this invention is to prepare new lubricating compositions having unusual adhesive properties which minimize loss of lubricant by dripping and retain the lubricant on the bearing surface. A further purpose of the invention is to provide a resinous composition which may be added to inferior liquid or solid lubricants, and thereby improve the body and tackiness of the said lubricants. A still further purpose is to provide a modified resin bodied oil or grease without sacrificing any of the original lubricating properties.

It has now been found that polystyrenes of molecular weights in excess of 150,000, and up to and including the molecular weight of 1,000,000, may be alkylated by reaction with an olefinic compound or an alkyl halide, which have at least four carbon atoms. The resulting alkylated polystyrene is soluble in petroleum derivatives and the solutions manifest unusually desirable lubricating properties.

The alkylated polystyrenes of high molecular weight are made by methods analogous to those used in the preparation of alkylated polystyrene of lower molecular weight except that more dilute solutions are usually required to effect a practicable rate of reaction and that the polystyrenes used are those of the desired high molecular weight. Suitable solvents for use in the alkylation step are ethylene dichloride, nitrobenzene, dichlorobenzene, carbon tetrachloride, monochlorobenzene, chloroform, carbon disulfide, and chloronitrobenzene. The alkylation reaction is conducted in the presence of a Friedel-Crafts catalyst, for example aluminum chloride, hydrogen fluoride, zinc chloride, hydrogen chloride and boron trifluoride. The conditions of the reaction, and particularly the temperature required, will depend upon the activity of the catalyst used. For example, when hydrogen fluoride is used, it is often desirable to cool the reaction to approximately 0° C. to prevent an excessive reaction rate, whereas when aluminum chloride is used, room temperature may be used without achieving an undesirable reaction rate. Where aluminum chloride is used as the catalyst, degradation of the polymer is sometimes encountered, which may be minimized by conducting the reaction in the presence of an organo nitro compound in accordance with the method described and claimed in application, Serial No. 670,041, filed May 15, 1946, by John M. Butler and Joachim Dazzi, now abandoned.

A wide variety of alkylating agents may be used in the preparation of the alkylated polystyrenes, for example the alkyl halides having at least four carbon atoms, such as butyl chloride, octyl bromide, lauryl chloride, stearyl chloride, and other homologous chlorides, fluorides or bromides. The hydrocarbon olefins having at least four carbon atoms, such as isobutylene, octene, homologous unsaturated hydrocarbons, mixtures of predominating straight chain olefins made by cracking high molecular weight paraffins, highly branched polymeric olefins made by the polymerization of propylene or butylene, and other unsaturated hydrocarbons, the unsaturated esters, such as methyl oleate, other alkyl esters of unsaturated acids, and unsaturated alcohol esters of saturated carboxylic acids, and in general any unsaturated organic compound or halide of a saturated organic compound which is capable of reacting with a benzene nucleus in the presence of a Friedel-Crafts catalyst, may be used.

The alkylated polystyrenes are prepared from polystyrenes having molecular weights in excess of 150,000. Since the very high molecular weight alkylated polystyrenes frequently are subject to degradation when used in lubricating compositions, the alkylated polystyrenes prepared from polystyrenes having molecular weights between 150,000, and 500,000, are generally preferred.

The alkylated polystyrenes are preferably prepared by dissolving the polystyrene of suitable molecular weight in a solvent, adding thereto the necessary catalyst, and thereafter gradually adding the alkylating agent at a rate which permits the maintenance of a practicable reaction rate without excessive increases in reaction temperature and reaction rate. After all of the alkylating agent has been added, it is frequently desirable to continue the reaction by stirring the reactants and gradually raising the temperature to insure completion of the reaction. The quality of the alkylated polystyrene will depend, at least in part, on the number and molecular weight of the substituents on the styrene ring. It has been found that each styrene ring should have an average of four to 16 carbon atoms in the alkyl substituents, and in the compositions of optimum desirability the alkyl substituents will have from six to 12 carbon atoms per styrene ring.

The new alkylated polystyrenes, when dissolved in lubricating oils and greases, imparts very desirable physical properties to the said lubricants. In the very viscous greases smaller proportions of the alkylated polystyrene, for example from 0.01 to 1.0 per cent will yield desirable compositions. In the semi-solid and more fluid lubricants it is often desirable to use up to five per cent by weight of the alkylated polystyrene.

The modified lubricating compositions may be made by physically mixing the lubricants and the alkylated polystyrene until a uniform homogeneous solution is obtained. In some instances, especially where the alkylated polystyrene is of very high molecular weight and the lubricating composition is especially viscous difficulty may be experienced in making homogeneous blends. In such cases it will be found advantageous to dissolve the alkylated polystyrene in a readily volatile organic solvent, such as ethylene dichloride, methylene dichloride, "petroleum ether," benzene and toluene. The solution of the alkylated polystyrene may then be readily blended with the lubricating composition and the volatile solvent thereafter distilled off to yield the desired homogeneous solution.

An alternative method of blending the tackifying agent with the grease, involves the use of "master batches" which are concentrated solutions of the alkylated polystyrene in a petroleum stock similar to the grease to be tackified. The master batch which may contain from five to 25 per cent of the alkylated polystyrene may be prepared by direct mixing, or it may be prepared by mixing the oil with a solution of the alkylated polystyrene in a volatile solvent and thereafter evaporating the solvent. The concentrated solution thus prepared is blended with the grease to form lubricants of the desired physical characteristics.

The invention is applicable to a wide variety of petroleum products, for example the hydrocarbons, including the paraffin, aromatic, naphthenic, and mixed stocks. The liquid, solid and semi-solid compositions may be similarly treated, except that in general more of the tackifying agent will be required to improve liquid hydrocarbons. The invention is of particular importance in treating solid lubricants, known as greases, which may be high molecular weight hydrocarbons, or may be normally liquid fractions which have been solidified by the addition of from one to 20 per cent of various gellation agents, such as soaps, for example calcium stearate, sodium stearate, aluminum stearate, lead stearate, other stearates, similar salts of oleic acid and salts of other long chain carboxylic acids, and mixtures of salts prepared from the mixed saponification products of animal and vegetable oils, and soaps of the rosin acids. Other thickening agents, such as antioxidants to prevent the formation of gums, conventional high pressure additives, and graphite may be used.

Further details of the practice of this invention are set forth with respect to the following examples:

Example 1

A 5-liter flask provided with an efficient rotary stirring mechanism, a dropping funnel, and a thermometer well was charged with 2000 grams of a five per cent polystyrene solution in orthodichlorobenzene. The polystyrene had a molecular weight of 226,000. The flask was also charged with 27.4 grams of aluminum chloride and 100 grams of nitrobenzene for the purpose of preventing the degradation of the polystyrene during the alkylation. A commercially available propylene polymer (Shell Oil Company) having a boiling point of 55° C. to 235° C. was gradually added to the reaction flask, 237 grams being added in three and one-half hours. The reaction mass was then washed with dilute hydrochloric acid and water and precipitated by pouring into 95 per cent ethyl alcohol in a Waring Blendor. The crude polymer so obtained was dissolved in benzene, reprecipitated in the Waring Blendor using a 95 per cent ethyl alcohol. A white powdery polymer was thereby obtained.

Example 2

The polypropylene alkylated polystyrene preparing in accordance with the preceding example was tested in a conventional manner as follows and compared with the best commercially available tackifying agent, polybutene. A one per cent sample of the alkylated polystyrene was prepared by first dissolving the polymer in ethylene dichloride, mixing it with a S. A. E. 10 mid-continent solvent refined oil in such proportions so that after the evaporation of the ethylene dichloride a ten per cent polymer was present in the oil solution. The oil blend so obtained was added to an oil-fatty acid soap grease base in such proportion so as to yield a final blend containing one per cent of the polymer. This blend was tested by passing a 100 gram sample through a Monton-Gaulin homogenizer at a pressure of 250 pounds per square inch for four hours. A sample of a one per cent polybutene solution in the same oil base was used as a control. Samples were periodically removed and the viscosities measured to determine the resistance to shear stress of the compositions. The following table shows the viscosities measured for each sample at the end of two, three and four hours.

| Composition | Test Period in Hours | | |
| --- | --- | --- | --- |
| | 2 | 3 | 4 |
| Blend of 1% Alkylated Polystyrene | 1,084 | 1,080 | 1,064 |
| Blend of 1% Polybutene | 1,080 | 1,077 | 1,032 |

The above data demonstrate that the alkylated polystyrene is substantially superior to the commercially available polybutene in that only a moderate reduction in shear resistance is experienced, whereas the polybutene demonstrates a substantial reduction after three hours of operation. In addition the alkylated polystyrene blend was substantially more tacky than the blend using polybutene.

Although the invention has been described with respect to specific examples, it is not intended that the details thereof shall be construed as limitations upon the scope of the invention except to the extent incorporated in the following claim.

What I claim is:

An improved grease which comprises a petroleum fraction containing from one to 20% of a fatty acid soap and from 0.01 to 5% of a compound made by the alkylation of a polystyrene having a molecular weight between 150,000 and 1,000,000, the alkyl group of said alkylated polystyrene having at least 4 carbon atoms and a total substituent having an average of from 6 to 12 carbon atoms per styrene ring.

JOHN MANN BUTLER.

References Cited in the file of this patent

UNITED STATES PATENTS

| Number | Name | Date |
|---|---|---|
| 2,282,456 | Christmann et al. | May 12, 1942 |
| 2,410,652 | Griffin et al. | Nov. 5, 1946 |
| 2,421,082 | Pier et al. | May 27, 1947 |
| 2,569,400 | Butler | Sept. 25, 1951 |
| 2,572,558 | Butler | Oct. 23, 1951 |

FOREIGN PATENTS

| Number | Country | Date |
|---|---|---|
| 640,566 | Great Britain | July 26, 1950 |